US008107151B1

(12) United States Patent
Ptasinski et al.

(10) Patent No.: US 8,107,151 B1
(45) Date of Patent: Jan. 31, 2012

(54) PLASMONIC LOGIC DEVICE

(75) Inventors: Joanna N. Ptasinski, San Diego, CA (US); Stephen Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 81 days.

(21) Appl. No.: 12/849,198

(22) Filed: Aug. 3, 2010

Related U.S. Application Data

(63) Continuation-in-part of application No. 12/424,164, filed on Apr. 15, 2009, now Pat. No. 8,085,459.

(51) Int. Cl.
*G02F 1/03* (2006.01)
*G02F 1/29* (2006.01)
*G02F 1/00* (2006.01)

(52) U.S. Cl. ........ 359/245; 359/315; 359/318; 359/321; 359/322; 359/900

(58) Field of Classification Search .................. 359/245, 359/247, 254, 315, 318, 321, 322, 900
See application file for complete search history.

(56) References Cited

U.S. PATENT DOCUMENTS

| 6,384,953 | B1 | 5/2002 | Russell et al. |
| 6,646,782 | B1 | 11/2003 | Russell et al. |
| 6,738,194 | B1 | 5/2004 | Ramirez et al. |
| 6,753,994 | B1 | 6/2004 | Russell |

OTHER PUBLICATIONS

U.S. Appl. No. 12/793,271 by Joanna N. Ptasinski et al., entitled "Plasmonic Router" filed Jun. 3, 2010, All.

*Primary Examiner* — Jack Dinh
(74) *Attorney, Agent, or Firm* — Arthur K. Samora; Kyle Eppele

(57) ABSTRACT

A plasmonic logic device can include a dielectric substrate, and first and second metallic input strips that are placed on the substrate. The input metallic strips can be made of different metals that support propagation of surface plasmons at different frequencies. The input metallic strips can be separated by a predetermined gap that causes for the surface plasmons to constructively combine or destructively cancel each other, according to the gap distances and strip materials chosen, to accomplish the desired logic function. A metallic output strip can be placed on the substrate at a distance from the metallic input strips that allows for selective propagation to accomplish different logic functions. The metallic output strip can further be chosen from a material that allows for propagation of surface plasmons over a broad frequency range to allow for evanescent coupling of a surface plasmon from the metallic input strips.

13 Claims, 5 Drawing Sheets

PLASMONIC LOGIC DEVICE

This application is a Continuation-In-Part of prior application Ser. No. 12/424,164, filed Apr. 15, 2009 now U.S. Pat. No. 8,085,459.

FEDERALLY-SPONSORED RESEARCH AND DEVELOPMENT

This invention (Navy Case No. 100225) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to opto-electronic devices. More particularly, the present invention pertains to active opto-electronic devices that manipulate surface plasmon phenomena to accomplish logic functions based on the propagation/non-propagation of the surface plasmon.

BACKGROUND OF THE INVENTION

Plasmons are quasiparticles resulting from the quantization of plasma oscillations, just as photons and phonons are quantizations of light and sound waves, respectively. Surface plasmons are those plasmons that are confined to surfaces and that interact strongly with light. They occur at the interface of a vacuum or material with a positive dielectric constant with that of a negative dielectric constant (usually a highly conductive material such as a conductive or doped dielectric).

Plasmonics is a field where one exploits the short wavelength of a surface plasmon in an analogous method as one exploits an optical wavelength for information transfer or data manipulation. But, rather than a quantum of light (a photon), a plasmon (collective excitation in electron density) is used.

Plasmons have also been proposed as a means of high-resolution lithography and microscopy due to their extremely small wavelengths. Both of these applications have seen successful demonstrations in the lab environment. Finally, Surface plasmons also have the unique capacity to confine light to very small dimensions which could enable many new applications.

Additionally, plasmons have been considered as a means of transmitting information on computer chips, since plasmons can support much higher frequencies (into the 100 THz range, while conventional wires become very lossy in the tens of GHz). But for plasmon-based electronics to be useful, a device that allows for control of the propagation (or non-propagation) of surface plasmons to accomplish logic functions must be invented.

In view of the above, it in an object of the present invention to provide a plasmonic logic device. Another object of the present invention is to provide a plasmonic logic device that does not require the surface plasmon to be sustained over a long distance (i.e. on the order of a cm or more). Yet another object of the present invention to provide a plasmonic logic device, wherein the surface plasmon wavelength is shorter than light, so that the effective active area of the device can be smaller than prior art logic devices. Still another object of the present invention is to provide a plasmonic logic device that can be fabricated using existing complementary-metal-oxide-semiconductor (CMOS) technology. Another object of the invention is to provide a plasmonic logic device that may operates at high speeds and at low power. Another object of the present invention is to provide a plasmon logic device that manipulates propagation/non-propagation of the surface plasmon to accomplish the basic AND, OR, NAND, NOR, XOR, or NOT Boolean logic functions.

SUMMARY OF THE INVENTION

A plasmonic logic device according to several embodiment of the present invention can include a dielectric substrate, and first and second metallic input strips that are placed on the substrate. The input metallic strips can be made of different metals/metal alloys which support propagation of surface plasmons at a first frequency, and a second frequency. The input metallic strips can be separated by a predetermined gap that causes the surface plasmons to constructively combine or destructively cancel each other, according to the desired logic function that the user desires to accomplish.

The logic device can further include a third metallic output strip placed on the substrate. The metallic output strip is placed apart from the input metallic strips at a distance, or predetermined gap, that allows for propagation under certain conditions to accomplish different logic functions. The metallic output strip can further be chosen from a material that allows for propagation of surface plasmons over a broad frequency, which allows for evanescent coupling of a surface plasmon from the metallic input strips for propagation through the metallic output strip.

For the methods according to several embodiments, the steps of providing a dielectric substrate and placing first and second metallic input strips and a metallic output strip on the substrate can be accomplished. The first metallic input strip can support propagation of a surface plasmon at a first frequency, while the second metallic input strip can support propagation of a surface plasmon at a second frequency. The third metallic output strip can be chosen from a material that supports transmission of surface plasmons at a frequency range that includes both the first frequency and the second frequency To accomplish the methods according to several embodiments, the metallic input strips can be spaced from each other by a predetermined gap. The spacing can be chosen so that the first and second plasmon constructively interfere with each other, which results in evanescent coupling in the output strip if both the first plasmon and second plasmon are present as inputs, to accomplish the logic AND function. Alternatively, the input strips can be spaced to cause destructive interference of the surface plasmons with each other, while the output strip can be placed close enough to the input strips for evanescent coupling so that dielectric can be chosen to allow propagation at the first frequency or the second frequency, to accomplish the XOR logic function.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, plasmonics is a field where one exploits the short wavelength of a surface plasmon in an analogous method as one exploits an optical wavelength for information transfer or data manipulation. But rather than a quantum of light (a photon), a plasmon (collective excitation in electron density) is used.

Figure 1:
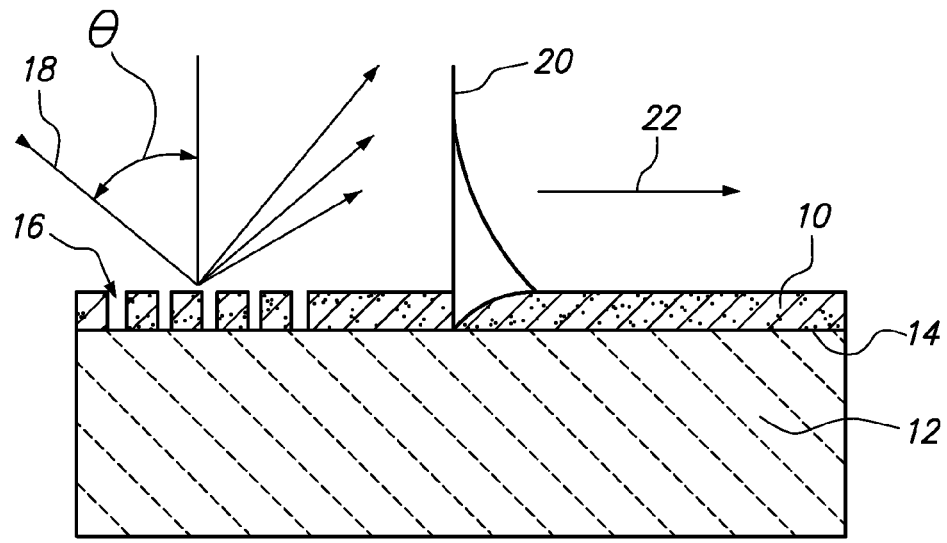
FIG. 1 is a greatly enlarged cross-sectional view of a dielectric electro-substrate and a conductive layer that shows the manner in which a grating can establish a surface plasmon at the substrate/conductive layer interface.
Figure 2:
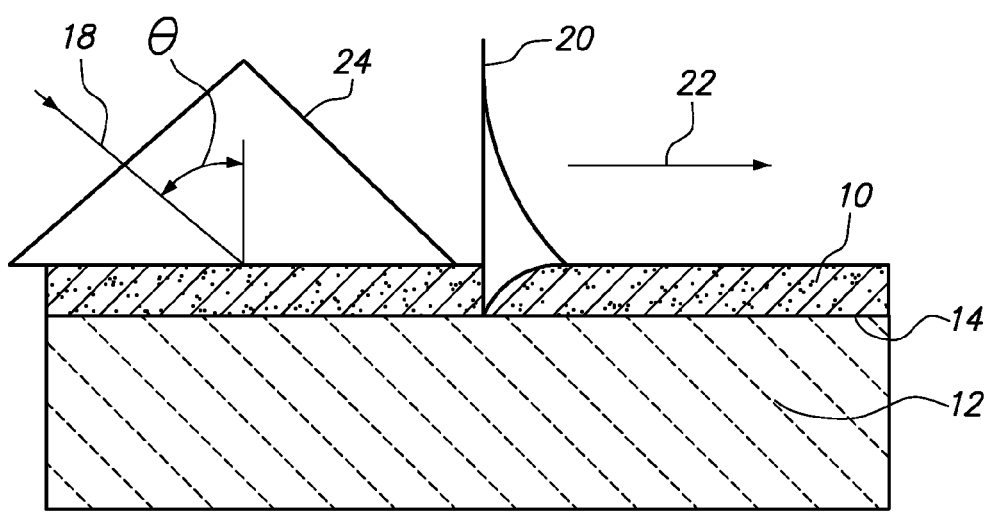
FIG. 2 is the same view as FIG. 1, but with a prism used to establish the surface plasmon instead of a grating.

To establish a surface plasmon, and referring initially to FIGS. 1 and 2, a conductive layer 10 is placed on an electro-optic substrate 12 to establish an interface 14. One may couple light 18 from light source 19 into the thin conductive layer 10 to form a surface plasmon 20 (surface plasmon 20 is not to scale in FIGS. 1 and 2), which travels along interface 14 in the direction of arrow 22 under specific coupling conditions. These coupling conditions are given by Equation [1]:

$$k_{sp} = k\left(\frac{\varepsilon_m \varepsilon_d}{\varepsilon_m + \varepsilon_d}\right)^{1/2} = \frac{\omega}{c}\sqrt{\varepsilon_d}\sin\theta \quad [1]$$

Where $k_{sp}$ is the surface plasmon wave-vector, k is the wave-vector of the incident radiation, $\varepsilon_m$ is the permittivity of the conductive layer (for purposes of this disclosure, permittivity is defined as the ability to transmit, or "permit" an electric field), $\varepsilon_d$ is the permittivity of the electro-optic substrate, w is the frequency at which coupling conditions occur and surface plasmon will propagate along interface 14, c is the speed of light and θ the angle (from vertical) at which coupling conditions will occur when light 18 impinges on the conductive layer.

There are well known methods of accomplishing this coupling of light 18 into conductive layer 10. For example, a plurality of grooves 16 can be formed in the conductive layer 10 as known in the art and as shown in FIG. 1. Alternatively, the coupling of light 18 could be accomplished using a high index prism 24 that is placed on conductive layer 10 to establish surface plasmon 20, as shown in FIG. 2. Other means that are known in the art include establishing an aperture coupling. See for example, U.S. Pat. No. 6,646,782, which issued to Russell et al. for an invention entitled "Solid State Surface Plasmon Light Valve and Tunable Filter", and which is assigned to the same assignee as the present invention, where this is described for a tunable optical filter.

As yet another alternative for the coupling of light 18 into conductive layer 10, one may choose to integrate a light source 19 onto the plasmonic device for effective coupling using photonic silicon devices such as Russell et al., U.S. Pat. No. 6,093,941 entitled "Photonic Silicon on a Transparent Substrate" (25 Jul. 2000), or other semiconductor or organic light emitting structures or nanostructures. Alternatively externally formed and operably coupled photonic devices may be integrated in a common package to the plasmonic device.

As can be seen by Equation [1], by varying permittivity of the electro-optic substrate, the resonance and propagation of the surface plasmon can be inhibited or encouraged, according to the needs of the user.

Figure 3:
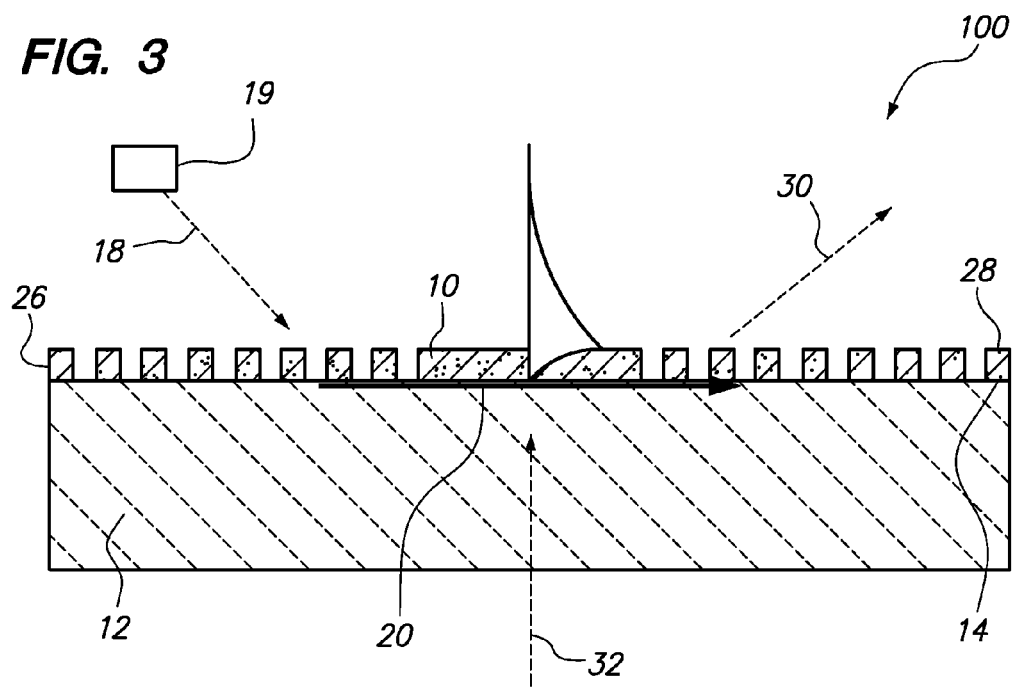
FIG. 3 is a cross-sectional view of the plasmonic logic device according to several embodiments of the present invention, with a grating used to establish the surface plasmon and a light source shown as the means for varying the electro-substrate permittivity.

Referring now to FIG. 3, the device 100 according to several embodiments of the present invention is shown. As shown in FIG. 3, and as mentioned above, a suitably patterned highly conductive layer 10 is placed on a suitable electro-optic substrate 12 to establish an interface 14, which is capable of supporting surface plasmon 20. The patterned conductive layer can be thought of as the effective "waveguide" for the surface plasmon. The conductive layer 10 has a plurality of grooves formed therein to establish an input coupling region 26 for incoming signal light 18 (analogous to the source in a transistor) and an output coupling region 28 for outgoing signal light 30, which is analogous to the drain of a transistor. The portion of the conductive layer 10 between input coupling region 26 and output coupling region 28 through which the surface plasmon propagates at interface 14 is analogous to the channel of a transistor.

To function as a plasmonic logic device, the device according to several embodiments of the present invention requires a third terminal to act as a logic device gate, i.e., to control the formation and propagation of surface plasmon 20 along interface 14. Recall that the permittivity of electro-optic substrate 12 can be manipulated to control the propagation of surface plasmons 20 along interface 14. To do this, a means for varying the electro-optic substrate 32 can be operably connected to the electro-optic substrate 12. In one embodiment, and as shown in FIG. 2, the varying means can be a pulsed light source 32 of a suitable wavelength can be absorbed in the electro-optic substrate to change the electro-optic properties. For this embodiment, the pulsed light source.

Figure 4:
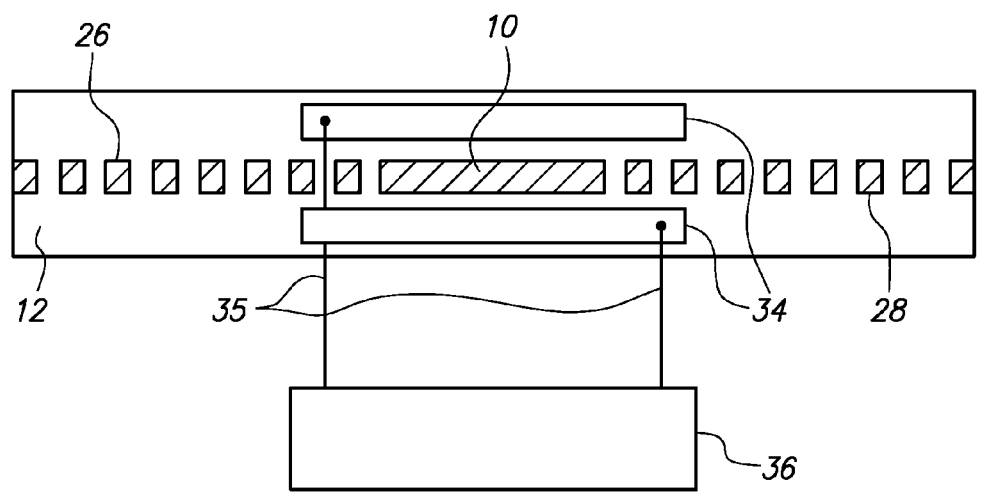
FIG. 4 is a top plan view of the plasmonic logic device shown in FIG. 3, but with a voltage source illustrated in lieu of a light source as the varying means.

There are other manners in which the varying means can affect the permittivity of electro-optic substrate. Specifically, and referring to FIG. 4, the electro-optic substrate may also have control electrodes 34 appropriately placed on or operably coupled to the substrate. The control electrodes may be in a parallel configuration, adjacent configuration or operably coupled configuration with respect to the conductive layer that supports the plasmon. The control electrodes can be connected to voltage source 36. By applying a voltage to the control electrodes one can vary the electro-optic properties of the substrate and therefore change the resonance frequency of the surface plasmon.

Figure 5:
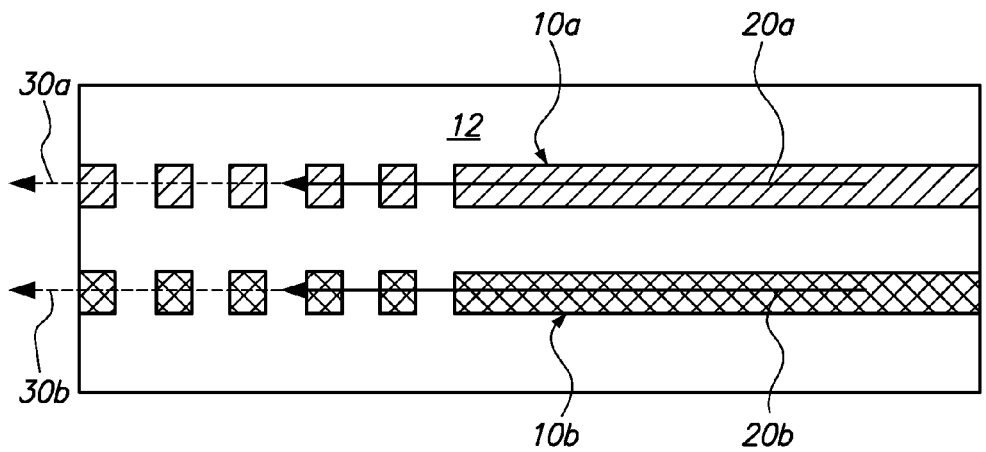
FIG. 5 is a top plan view of the plasmonic logic device shown in FIG. 3, but with multiple conductive layers placed on the electro-optic substrate, to allow for selective propagation of surface plasmons at different frequencies; and, FIG. 6 is the same view as FIG. 5, which is used to illustrate the plasmonic AND, OR, XOR and NOT logic functions.

Additionally, and as shown in FIG. 5, one or more of the control electrodes may be connected to a photodetector 38 such as a photodiode or photologic device so that a high speed light pulse can generate a high speed voltage pulse to vary the electro-substrate permittivity, and thereby control the plasmonic device.

For several embodiments of the invention, the plasmonic logic device 100 can be in a normally-on configuration (with surface plasmons 20 propagating along interface 14). For these embodiments, the electro-substrate permittivity can be manipulated to change the permittivity to "turn off", or inhibit, the propagation of surface plasmon 20. In yet other embodiments, the plasmonic logic device 100 would be in a normally-off configuration and the varying means would manipulate the electro-substrate permittivity to increase the permittivity and "turn on", or encourage, the propagation of surface plasmons 20 along interface 14. Therefore, the plasmonic logic device according to several embodiments of the invention can act as a switch, analogous to a logic device, and can produce a logic zero or logic one.

Referring now to FIG. 5, another embodiment uses suitable patterning of multiple conductive layers 10a, 10b regions that can direct support and allow coupling of light for formation of respective surface plasmons 20a, 20b at specific frequencies. In FIG. 5, conductive layer 10b can be made of a silver (Ag) material, which allows for propagation of surface plasmon 20b at resonant frequency $\omega_1$ and wherein the output light is transmitted at a 1.5 µm wavelength. On the same electro-optic substrate 12, conductive layer 10a can be made of an aluminum (Al) material. For conductive layer 10a, surface plasmon 20a forms at a different resonant frequency and propagates in an aluminum layer, and the output light is transmitted at a 0.5 µm wavelength. Similar to the above description, one can control which output will be obtained by changing the resonant frequency of the surface plasmon by varying the permittivity of the electro-optic substrate 12 through the use of an input voltage of light control pulse (in FIG. 5, electrodes 34 are connected to a photodetector 38 such as a photodiode or photologic device so that a high speed light pulse can generate a high speed voltage pulse to vary the electro-substrate permittivity, and thereby control the plasmonic device as described above.

For the materials according to several embodiments of the present invention, Al, Au, Rh, Al, metal alloys and other highly conductive materials can be used for the surface plasmon. There are typically advantages for using conductive metals that will produce a narrow plasmon resonance such as Ag, since one can switch between the digital one and zero state easily. But Rh—Al, which has a broadband resonance may be able to produce an analog output (by varying intensity) rather than a digital response. One could in principle form mixed-signal (analog and digital) plasmonic devices on the same substrate by patterning different conductive layers. An analogous construction can also be made for complementary plasmonic logic device devices, where one could turn off one device and one turn on another like CMOS for an energy efficient plasmonic circuit architecture.

For materials of the electro-optic substrate, lithium niobate (LiNbO3), strontium barium niobate (SBN), lead zirconate tantalate (PZT), lanthanum doped lead zirconate tantalate (PLZT), zinc oxide (ZnO), potassium dihydrogen phosphate (KDP), and the like which includes electro-optic ceramics with the titanate, tantalate, zirconate compositions and also electro-optic polymers and polymer gelatins. The substrates may also be composed of a concatenation of layers, and therefore may also include electro-optic liquid crystals confined between other layers. Wavelength range can be selected from: visible wavelengths, near-infrared wavelengths.

The arrangement of metallic the structure and cooperation of structure described above can be shown at greater detail to accomplish logic functions using plasmonics. Exemplary plasmonic logic devices are described more fully below in the corresponding figures and descriptions.

A. Logic "OR" Function

Figure 6:
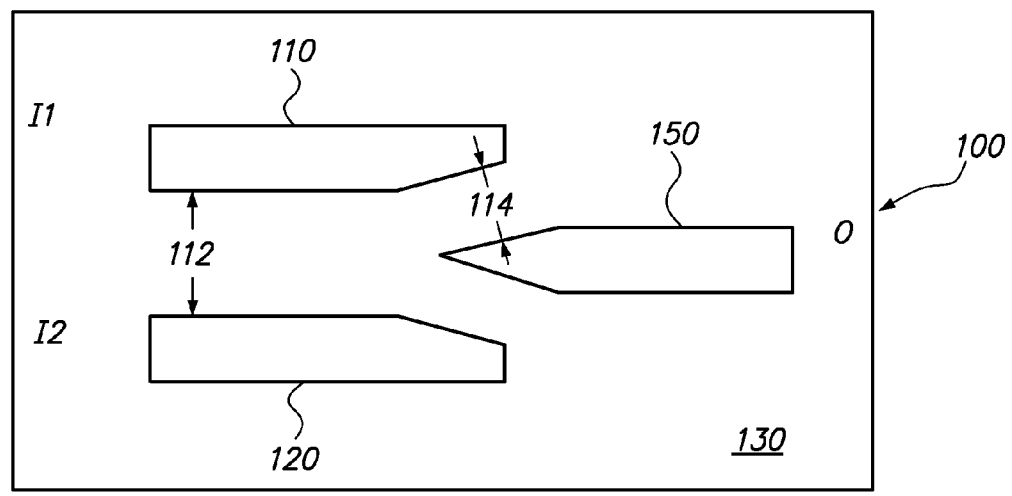

Referring now to FIG. 6, the logic "OR" function is an operation on two logical values that typically have two propositions (or values) that produces a value of true if and only if at least one of its operands are true. The truth table for input 1 (I1) and input 2 (I2) and the output (O=I1 OR I2) is given by Table 1:

TABLE 1

| I1 | I2 | O |
|---|---|---|
| 0 | 0 | 0 |
| 0 | 1 | 1 |
| 1 | 0 | 1 |
| 1 | 1 | 1 |

FIG. 6 schematically shows a top plan view of surface plasmon logic device 100. In FIG. 6, a first metallic input strip 110 that is disposed to support coupled light of wavelength $\lambda 1$ and propagate a surface plasmon of resonant frequency $\omega 1$. A second metallic input strip 120 is disposed on substrate to support coupled light of wavelength $\lambda 2$ and propagate a surface plasmon of resonant frequency $\omega 2$. The surface plasmons of frequencies $\omega 1$ and $\omega 2$ propagate at the interface between dielectric substrate 130 and the respective metal layers 110 and 120, in the manner described above.

The surface plasmon logic device 100 is further comprised of an output metallic strip 150 selected to propagate surface plasmons of frequency $\omega 1$ and $\omega 2$ through the control of the dielectric layer 130 on which it rests. Dielectric layer 130 is typically formed by an electro-optic material whose dielectric constant can be varied through the application of an applied voltage or illumination with light analogous to FIG. 1. The surface plasmon may propagate across the gap depicted in the metallic layers by evanescent coupling. This is further described in co-pending U.S. patent application Ser. No. 12/793,271, by Ptasinski et al. for an invention entitled "Plasmonic Routing Device", which is assigned to the same assignee as the present invention, and the contents of which are incorporated herein.

Comparing with the corresponding logic truth table for this device, where input I1 corresponds to the surface plasmon of frequency $\omega 1$ and input I2 corresponds to the surface plasmon of frequency $\omega 2$. If there is no surface plasmon of frequency $\omega 1$ and no surface plasmon of frequency $\omega 2$ then the output O is zero. If there is an input surface plasmon to either input I1 or input I2 or both simultaneously, then there will be an output at O. This is because metal layer 150 is designed to support propagation at $\omega 1$ or $\omega 2$. This is achieved by using a metal-dielectric combination with a broadband response as described in co-pending patent disclosures and applications. Note, in this example $\lambda 1$ may be equal to $\lambda 2$, and $\omega 1$ may equal $\omega 2$, although it is not required. The "OR" device is designed as a passive, normally "on" device, such that an output will occur without additional controls whenever there is an input.

B. Logic "AND" Function

Logical conjunction, otherwise known as a logic "AND" function, is an operation on two logical values that typically have two propositions (or values) that produces a value of true if and only if both of its operands are true. The truth table for input 1 (I1) and input 2 (I2) and the output (O=I1 AND I2) is given by Table 2:

TABLE 2

| I1 | I2 | O |
|---|---|---|
| 0 | 0 | 0 |
| 1 | 0 | 0 |
| 0 | 1 | 0 |
| 1 | 1 | 1 |

Comparing with the corresponding logic truth table for this device, where input I1 corresponds to the surface plasmon of frequency $\omega 1$ and input I2 corresponds to the surface plasmon of frequency $\omega 2$. If there is no surface plasmon of frequency $\omega 1$ and no surface plasmon of frequency $\omega 2$ then the output O is zero. If there is an input surface plasmon to only input I1 or only to input I2, then there will be no output at O. In this embodiment, the materials for metallic input strips 110, 120, and the spacing of gap 112 therebetween, are chosen so that if there is a surface plasmon at both inputs, the evanescent tails constructively add. Metallic output strip is spaced apart from input strip 110 and 120 by a predetermined gap 114 that is large enough so that evanescent coupling of a plasmon from input strips 110, 120 to output strip 150 only occurs if constructive addition occurred to provide a combined evanescent tail with sufficient energy to overcome the barrier and jump gap 114 by evanescent coupling to metallic output layer 150. This "AND" device is designed as a passive, normally "ON" device, and the output will occur without additional controls.

Alternatively, the device may be designed with added sensors (not shown) and a control line (not shown) between metallic input strips 110, 120 and metallic output strip 150 to allow the surface plasmon propagation if there are surface plasmons present at both inputs, or to inhibit propagation if there are not surface plasmons present at both inputs. This may be constructed using optical sensors operably coupled to the input gratings of metal layers 110 and 120 which detect a fraction of the incident light and subsequently control a voltage across the dielectric layer 130. The change in voltage tune the dielectric constant of substrate 130, to allow propagation only if surface plasmons exist in both inputs.

C. Logical "XOR" Function.

Exclusive disjunction, otherwise know as a logic "XOR" function, is an operation on two logical values that typically have two propositions (or values) that produce a value of true if one but not both of its operands are true. The truth table for input 1 (I1) and input 2 (I2) and the output (O=I1 XOR I2) is given by Table 3:

TABLE 3

| I1 | I2 | O |
|---|---|---|
| 0 | 0 | 0 |
| 1 | 0 | 1 |
| 0 | 1 | 1 |
| 1 | 1 | 0 |

Comparing with the corresponding logic truth table for this device, where input I1 corresponds to the surface plasmon of frequency $\omega 1$ and input I2 corresponds to the surface plasmon of frequency $\omega 2$. If there is no surface plasmon of frequency $\omega 1$ and no surface plasmon of frequency $\omega 2$ then the output O is zero. If there is an input surface plasmon to either input I1 or input I2 then there will be an output at O. If there is an input surface plasmon to both input I1 and input I2 then the output O is zero. This is because metal layer 350 is designed to support propagation only at $\omega 1$ or $\omega 2$. This "XOR" device is designed as a passive, normally "on" device, such that an output will occur without additional controls whenever there is an input.

To accomplish the XOR function, and referring again to FIG. 6, the aforementioned predetermined, gap 112 and the materials for metallic input strips 110 and 120 are selected so that there is destructive interference between surface plasmons from metallic strips 110 and 120, because frequencies $\omega 1$ and $\omega 2$ cause the surface plasmons to propagate out of phase. With this configuration, evanescent coupling occurs and an output occurs if there is an input at input strip 110 or input strip 120, but not if there is an input at both metallic input strips 110, 120 of if there is no input at either metallic strip 110, 120.

Alternately, the device may be designed with added sensors and a control line as described above to allow the surface plasmon propagation if there are surface plasmons present at either but not both inputs, or to inhibit propagation if there are surface plasmons present at both inputs.

D. Logical "NOT" Function.

Logical negation, otherwise known as the logic "NOT" is an operation on one logical value that produces the value of true if its operand is false and a value of false if its operand is true. The truth table for an input (I) and the output (O) is given by Table 6:

TABLE 4

| I | O |
|---|---|
| 0 | 1 |
| 1 | 0 |

Figure 7:
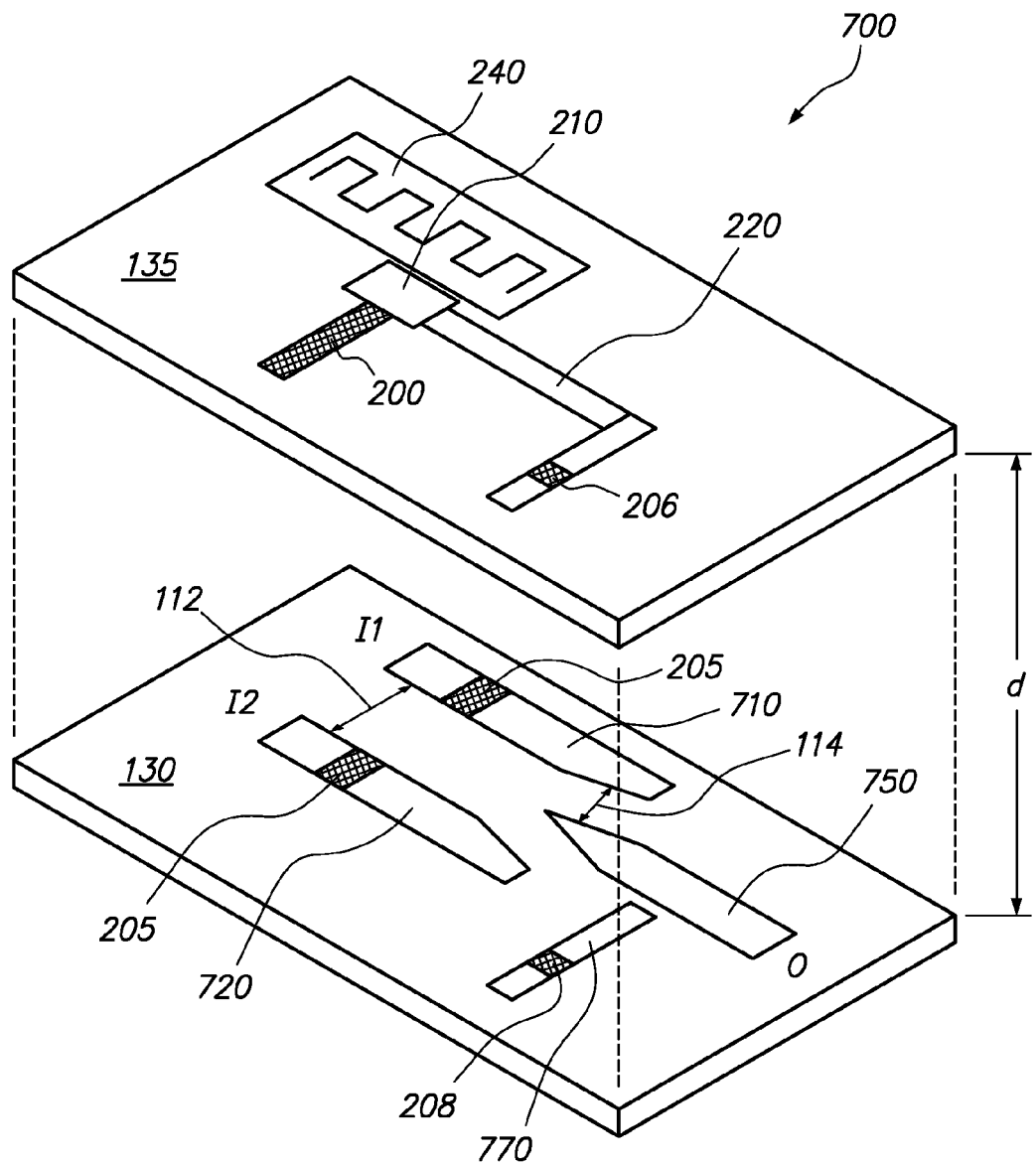
FIG. 7 is a side elevational view of the plasmonic logic device shown in FIG. 3, but with additional layers shown to depict an example active configuration for purposes of illustrating the plasmonic NOT, NAND and NOR logic functions; and, FIG. 8 is a block diagram that is illustrative of the steps that can be taken to accomplish the methods according to several embodiments of the present invention.

Referring now to FIG. 7, an active surface plasmon logic device 700 is shown. Like passive devices, the active device includes dielectric substrate 130, which is formed with input metallic strips 710 and 720 that are separated from each other by the aforementioned gap 112 (only one of strips 710 or 720 is used for the NOT logic function). An output metallic strip 750 is spaced-apart from strips 710 and 7210 by gap 114. Device 700 further includes a control metallic strip 770 that is formed on substrate 130, as shown in FIG. 7.

As shown in FIG. 7 active plasmon logic devices also include a control substrate 135, which is formed with a control grating 200 that corresponds to control gratings 205 that are formed in input metallic strips 710 and 720. Another grating 206 is formed in control waveguide 220; grating 206 corresponds to a grating 208 that is formed in control metallic strip. Control substrate 135 is further formed with a sensor 210 that is connected to control grating 200 and waveguide 220, and clock 240. As shown in FIG. 7, there is a separation distance d between substrate 130 and control substrate 135, which is sufficient to prevent evanescent coupling between substrate 130 and control substrate 135 except through gratings 200 and 205, and 206 and 208.

If there is an input surface plasmon at I1, there is no output at O. This may be achieved by having a gap 114 with sufficient spacing between metal layers 110 and 150, or controlling a barrier to the evanescent coupling through the application of an applied voltage or illumination of light to substrate 130 as previously described. If there is no input surface plasmon at input I1 or I2, then sensor 210 in control substrate 135 senses "no input" and sends an output plasmon via waveguide 220 (through grating 206) to control metallic strip 770 (through grating 208). Control metallic strip 770 transmits said plasmon to output metallic strip 750 via evanescent coupling as described above. This "NOT" device is designed as an "active" device, and requires an optical feedback to trigger the generation of a surface plasmon at the correct time in the logic cycle of clock 240.

E. Logical "NAND" Function.

The logical "NAND" is an operation on two logical values that typically have two propositions (or values) that produce a value of false if and only if both of its operands are true. Stated in a different manner, it produces a value of true if and only if at least one of its operands is false. The logical "NAND" is expressible as a compound of the logic "NOT" and the logic "AND" functions. The truth table for input 1 (I1) and input 2 (I2) and the output (O=I1 NAND I2) is given by Table 4:

TABLE 5

| I1 | I2 | O |
|---|---|---|
| 0 | 0 | 1 |
| 1 | 0 | 1 |
| 0 | 1 | 1 |
| 1 | 1 | 0 |

Referring again to FIG. 7, FIG. 7 shows a top view of the surface plasmon logic device 700 that operates as a logic "NAND" device comprised of a metallic input strip 710 that is disposed to support coupled light of wavelength $\lambda 1$ and propagate a surface plasmon of resonant frequency $\omega 1$ and a metallic input strip 720 that is designed to support coupled light of wavelength $\lambda 2$ and propagate a surface plasmon of resonant frequency $\omega 2$. The surface plasmons of frequencies $\omega 1$ and $\omega 2$ propagate at the interface between dielectric substrate 130 and the respective metallic input strips 710 and 720. Note that the control substrate 135 has the same structure as for the NOT plasmon logic device. However, substrate 130 requires both metallic input strips 710 and 720 to function as a NAND device. Note also that substrate 130 is denoted identically as in the prior FIG. 6, as it is expected that multiple logic devices could be formed on the same substrate.

If there is no input at I1 or I2, then sensor 210 in control substrate 135 senses "no input" and sends an output plasmon via waveguide 220 and grating 206, through grating 208 to control metallic strip 770. If there is an input at either I1 or I2, then sensor 210 detects the input and it allows for I1 or I2 propagation through strip 710 or 720 to output strip 750 via evanescent coupling. If there is an input at both I1 and I2, then sensor 210 senses the large input signal (double the signal because I1 and I2 are involved) and electro-optically modulates the substrate 130 so the no coupling occurs to the output waveguide in substrate 130, either from metallic input strips 710, 710 or from metallic control strip 770. Once at metallic control strip 770, the surface can accomplish evanescent coupling to metallic output strip 750 to establish a surface plasmon output.

F. Logical "NOR" Function.

Logical "NOR" is an operation on two logical values that typically have two propositions (or values) that produces a value of true if and only if both of the operands are false. The logical "NOR" is expressible as a compound of the logical "NOT" and "OR". The truth table for input 1 (I1) and input 2 (I2) and the output (O=I1 NOR I2) is given by Table 6:

TABLE 6

| I1 | I2 | O |
|---|---|---|
| 0 | 0 | 1 |
| 1 | 0 | 0 |

TABLE 6-continued

| I1 | I2 | O |
|---|---|---|
| 0 | 1 | 0 |
| 1 | 1 | 0 |

Referring again to FIG. 7, the NOR plasmon logic according to several embodiments has the same structure as the NAND and NOT plasmon logic devices as described above. A metallic input strip of metal 710 is disposed to support coupled light of wavelength $\lambda 1$ and propagate a surface plasmon of resonant frequency $\omega 1$, and a metallic input strip of metal 720 is disposed to support coupled light of wavelength $\lambda 2$ and propagate a surface plasmon of resonant frequency $\omega 2$. The surface plasmons of frequencies $\omega 1$ and $\omega 2$ propagate at the interface between dielectric substrate 130 and the respective metal layers 710 and 720.

Metallic output strip 750 is selected of a material that propagates only surface plasmons of frequency $\omega 1$ or frequency $\omega 2$ through the control of the dielectric layer 130 on which it rests. Dielectric layer 130 can typically be formed by an electro-optic material whose dielectric constant can be varied through the application of an applied voltage or illumination with light analogous to FIG. 1. This device also has a control line control metallic strip 770, used to couple a surface plasmon of frequency $\omega 1$ or frequency $\omega 2$ to output O. In this device structure, the surface plasmons at input 1 and input 2 may not propagate across the gap depicted in the metallic layers by evanescent coupling. Comparing with the corresponding logic truth table for this device, where input I1 corresponds to the surface plasmon of frequency $\omega 1$ and input I2 corresponds to the surface plasmon of frequency $\omega 2$. The NOR plasmon logic device further includes the control substrate 135 and associated structure as shown in FIG. 7 and described above for the NOT and NAND devices.

If there is no input at I1 or I2, then sensor 210 in control substrate 135 senses "no input" and generates an output surface plasmon via waveguide 220, grating 206 to metallic control strip 750 (via grating 208). If there is an input at I1 or I2 (or both), sensor 210 sense the input and electro-optically modulates substrate 130 so that no coupling occurs to metallic output strip 750, either from metallic input strips 710 and 720 or via control strip 770. Stated differently, even if there is a surface plasmon present at either or both inputs, the device is designed to have a barrier which prevents an output at O. If there is no surface plasmon of frequency $\omega 1$ or frequency $\omega 2$ at the inputs, then the control line is used to couple a surface plasmon of frequency $\omega 1$ or frequency $\omega 2$ to the output O. This is because metallic output strip 750 is designed to support propagation only at either frequency $\omega 1$ or frequency $\omega 2$ or both as desired. This "NOR" device is designed as an "active" device, and requires an optical feedback to trigger the generation of a surface plasmon at the correct time in the logic clock 240 cycle.

Also, it should be noted that FIGS. 6 and 7 denote schematic designs, and may not represent the true layout desired to optimize the use of space of a plasmonic device. Accordingly, there may be some portions of the logic structures, for example where there is an intentional barrier to plasmonic propagation that could be eliminated from the actual design layout to optimize the use of space. Furthermore, in accordance with standard micro-fabrication methods, the medium between control substrate 135 and substrate 130 may be comprised of vacuum, air or a dielectric medium such as silicon dioxide, silicon nitride, and the like.

Figure 8:
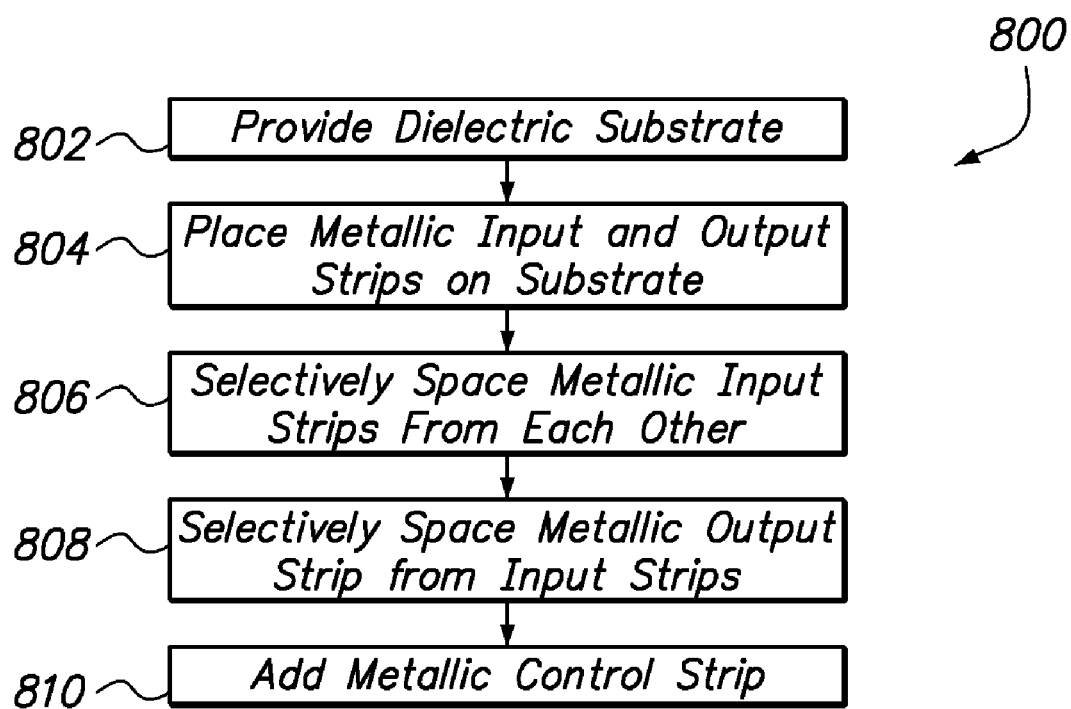

Referring now to FIG. 8, a block diagram is shown that represents steps of methods that can be taken to accomplish the logic functions using surface plasmonics according to several embodiments of the present invention. As shown in FIG. 8, the methods can include the step of providing a dielectric substrate, as shown by block 802. The methods according to several embodiments can further include the step of placing a first and second metallic input strips and an output metallic strip, as annotated by block 804. The materials for the metallic input and output strips can be chosen to facilitate propagation of the surface plasmons at the metallic strip/dielectric interface at different frequencies and wavelengths, as shown in the Figures and described above.

The methods can further include the step of spacing the metallic input strips a predetermined distance from each other, which results of destructive interference of the corresponding surface plasmons, or constructive addition of the surface plasmon for the first and second metallic input strips, as chosen by the user. This is indicated by block 806 in FIG. 8. The methods also include the step 808 of selectively spacing the metallic output strip from the metallic input strips so that evanescent coupling of a surface plasmon from the input strips to the output strips only occurs if the evanescent tails resulting from the input surface plasmons constructively add to each other. If step 806 has been accomplished in a manner that causes the surface plasmons to destructively interfere with each other, the spacing chose in step 808 is such that the resulting combined input plasmon will not have enough energy to accomplish evanescent coupling to the metallic output strip. Finally, a control metallic strip can be added to accomplish the NAND and NOR logic function, as indicated by block 810, using the structure described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A plasmonic logic device comprising:
a dielectric substrate;
a first metallic input strip placed on said substrate;
a second metallic input strip placed on said substrate, said second metallic strip being spaced-apart from said first metallic strip by a predetermined gap;
a third metallic output strip placed on said substrate;
wherein said first metallic strip supports propagation of a surface plasmon at a first frequency, wherein said second metallic strip supports propagation of a surface plasmon at a second frequency, and wherein said third metallic output strip is made of a material that supports transmission of surface plasmons at a frequency range that includes said first frequency and second frequency.

2. The device of claim 1 wherein said materials for said first metallic strip, said second metallic strip and said metallic output strip are selected from the materials consisting of Nd:YCOB Nd-doped YCOB, Cadmium Zinc Telluride (CdZnTe) or CZT, Lithium Niobate, Lithium Tantalate, Nitrobenzene, Lead-Lanthanum-Zirconate-Titanate (PLZT), Zinc Selenide (ZnSe), Zinc Telluride (ZnTe), Potassium dihydrogen ortho phosphate (KDP), Barium titanate (BaTiO3) and Strontium titanate (SrTiO3).

3. The device of claim 1 further comprising:
a means for generating a first surface plasmon in said first input metallic strip;
a means for generating a second surface plasmon in said second input metallic strip, said first surface plasmon and said second plasmon both being formed with a respective evanescent tail;
wherein said predetermined gap allows for constructive addition of said evanescent tails; and
said output strip being placed far enough from said input metallic strips so that evanescent coupling from said first and second metallic input strips to said output strips will only occur when said evanescent tails have constructively combined.

4. The device of claim 1 further comprising:
a means for generating a first surface plasmon in said first input metallic strip;
a means for generating a second surface plasmon in said second input metallic strip, said first surface plasmon and said second plasmon both being formed with a respective evanescent tail;
wherein said predetermined gap causes destructive addition of said evanescent tails; and
said output strip being placed far enough from said input metallic strips so that evanescent coupling from said first and second metallic input strips to said output strips will only occur when said evanescent tails have constructively combined.

5. The device of claim 1 further comprising:
a metallic control strip placed on said dielectric substrate and spaced-apart from said metallic output strip;
a control substrate overlaid over said dielectric substrate by a predetermined distance; and,
a control sensor and a plasmon waveguide embedded in said control substrate, said sensor selectively generating a surface plasmon for further transmission through said waveguide, between said control substrate and said dielectric substrate and to said metallic control strip.

6. A method for accomplishing logic functions using a surface plasmon comprising the steps of:
   A) providing a dielectric substrate;
   B) placing a first metallic input strip, a second metallic input strip and a third metallic output strip on said substrate;
   wherein said first metallic strip supports propagation of said surface plasmon at a first frequency, wherein said second metallic strip supports propagation of a surface plasmon at a second frequency, and wherein said third metallic output strip is made of a material that supports transmission of surface plasmons at a frequency range that includes said first frequency and second frequency;
   C) selectively spacing said first and said second metallic input strips from each other; and,
   D) selectively spacing said metallic output strip from said metallic input strips.

7. The method of step 6 wherein said step C) is accomplished so that said first surface plasmon and said second plasmon constructively add to form a constructive surface plasmon, and further where said step D) is accomplished by spacing said output strip from said input strips at a distance that is allows for evanescent coupling of said constructive surface plasmon to accomplish the AND logic function.

8. The method of claim 6 further comprising the step of:
   E) choosing a material for said output metallic strip to only allows for propagation of a surface plasmon as said first frequency or said second frequency to accomplish the logic OR function.

9. The method of claim 6 wherein said step C) is accomplished so that said first surface plasmon and said second plasmon destructively cancel each other, further wherein said step D) is accomplished by spacing said output strip from said input strips at a distance that is allows for evanescent coupling of either said first surface plasmon or said second surface plasmon to accomplish the XOR logic function.

10. The method of claim 6 wherein said step B) is accomplished using materials selected from the group consisting of Nd:YCOB Nd-doped YCOB, Cadmium Zinc Telluride (CdZnTe) or CZT, Lithium Niobate, Lithium Tantalate, Nitrobenzene, Lead-Lanthanum-Zirconate-Titanate (PLZT), Zinc Selenide (ZnSe), Zinc Telluride (ZnTe), Potassium dihydrogen ortho phosphate (KDP), Barium titanate (BaTiO3) and Strontium titanate (SrTiO3).

11. The method of claim 6, further comprising the steps of:
   F) placing a metallic control strip on said dielectric substrate;
   G) providing a control substrate over said dielectric substrate;
   H) embedding a sensor and a waveguide in said control substrate, said sensor being connected to said metallic input strips and to said waveguide, said step H) being accomplished that that said waveguide is at a predetermined distance that is sufficient for evanescent coupling between said waveguide and said metallic output strip; and,
   I) selectively generating a surface plasmon with said sensor according to inputs sensed as said metallic input strips, said surface plasmon transmitting through said waveguide to said metallic control strip for further evanescent coupling to said metallic output strip.

12. The method of claim 11, wherein said step I) is accomplished when there is no input surface plasmon at either said metallic input strip, to accomplish the NOR logic function.

13. The method of claim 11, wherein said step I) is accomplished when there is no input surface plasmon at either said metallic input strip, and also accomplished when there is an input surface plasmon at either one, but not both, of said metallic input strips, to accomplish the NAND logic function.

* * * * *